United States Patent
Huang et al.

(10) Patent No.: US 11,762,507 B2
(45) Date of Patent: Sep. 19, 2023

(54) FINGERPRINT SENSING DEVICE AND FINGERPRINT SENSING METHOD

(71) Applicant: Novatek Microelectronics Corp., Hsinchu (TW)

(72) Inventors: Min Huang, Taoyuan (TW); Jung-Yu Tsai, New Taipei (TW); Chi-Ting Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/880,683

(22) Filed: Aug. 4, 2022

(65) Prior Publication Data

US 2023/0230412 A1 Jul. 20, 2023

Related U.S. Application Data

(60) Provisional application No. 63/300,054, filed on Jan. 17, 2022.

(51) Int. Cl.
*G06F 3/041* (2006.01)
*G06V 40/13* (2022.01)
(Continued)

(52) U.S. Cl.
CPC .......... *G06F 3/04182* (2019.05); *G06F 3/042* (2013.01); *G06F 3/0412* (2013.01);
(Continued)

(58) Field of Classification Search
CPC ............. G06V 40/1318; G06K 9/0004; H04N 5/3532; H04N 5/3535; H04N 5/3554; H04N 5/378
See application file for complete search history.

(56) References Cited

U.S. PATENT DOCUMENTS 10,956,705 B2  3/2021  Han et al.
2019/0197287 A1  6/2019  Han et al.
(Continued)

FOREIGN PATENT DOCUMENTS

CN  110008805  7/2019
CN  113361416  9/2021
TW  202034144  9/2020

OTHER PUBLICATIONS

"Office Action of Taiwan Counterpart Application", dated Dec. 16, 2022, p. 1-p. 6.

*Primary Examiner* — Yuzhen Shen
(74) *Attorney, Agent, or Firm* — JCIPRNET

(57) ABSTRACT

A fingerprint sensing device that includes an analog-front-end (AFE) circuit, an analog-to-digital converter (ADC) and a correction circuit is introduced. The AFE circuit generates an image signal, and the ADC converts the image signal to an output digital code. The correction circuit receives a plurality of first output digital codes that are generated by performing a plurality of first fingerprint sensing operations in a plurality of first exposure time periods. The correction circuit is further configured to calculate a second exposure time period for a second fingerprint sensing operation according to the first output digital codes and the first exposure time periods, wherein the fingerprint sensing device performs the second fingerprint operation in the second exposure time period to generate a second output digital code.

18 Claims, 8 Drawing Sheets

(51) Int. Cl.
  *G06F 3/042*   (2006.01)
  *G06F 21/32*   (2013.01)
  *H03M 1/12*    (2006.01)

(52) U.S. Cl.
  CPC ............ *G06F 3/0421* (2013.01); *G06F 21/32*
       (2013.01); *G06V 40/1318* (2022.01); *H03M*
       *1/12* (2013.01)

(56) References Cited

U.S. PATENT DOCUMENTS

2020/0097697 A1* 3/2020 Lin .................... G06V 40/1365
2020/0175248 A1* 6/2020 Wu ...................... G06V 10/141
2020/0275001 A1  8/2020 Jhang et al.

\* cited by examiner

FINGERPRINT SENSING DEVICE AND FINGERPRINT SENSING METHOD

CROSS-REFERENCE TO RELATED APPLICATION

This application claims the priority benefit of U.S. provisional application Ser. No. 63/300,054, filed on Jan. 17, 2022. The entirety of the above-mentioned patent application is hereby incorporated by reference herein and made a part of this specification.

BACKGROUND

Technical Field

The disclosure generally relates to a fingerprint sensing device, and more particularly to a fingerprint sensing device and a fingerprint sensing method that are capable of improving a performance of fingerprint recognition.

Description of Related Art

Fingerprint sensors are widely applied in a variety of electronic devices such as mobile phone, laptop and personal digital assistant (PDA) for fingerprint recognition. During the fingerprint recognition using an optical fingerprint sensor, a fingerprint image that is captured under appropriate exposure time is critical for the accuracy of the fingerprint recognition. Auto exposure (AE) can be used to set the exposure time for capturing the fingerprint image; however, AE process is time-consuming since it requires multiple frames to stabilize the convergence. It is desired to quickly and accurately determine the appropriate exposure time as well as correction values for fingerprint recognition.

Nothing herein should be construed as an admission of knowledge in the prior art of any portion of the present disclosure.

SUMMARY

A fingerprint sensing device and a fingerprint sensing method that are capable of improving a performance of fingerprint recognition is introduced.

The fingerprint sensing device may include an analog-front-end (AFE) circuit, an analog-to-digital converter (ADC) and a correction circuit. The AFE circuit is configured to generate an image signal; and the ADC is configured to convert the image signal to an output digital code. The correction circuit is coupled to the ADC, and is configured to receive a plurality of first output digital codes that are generated by performing a plurality of first fingerprint sensing operations in a plurality of first exposure time periods. The correction circuit is further configured to calculate a second exposure time period for a second fingerprint sensing operation according to the first output digital codes and the first exposure time periods, wherein the fingerprint sensing device performs the second fingerprint operation in the second exposure time period to generate a second output digital code.

The fingerprint sensing method may include steps of performing a plurality of first fingerprint sensing operations in first exposure time periods to generate a plurality of first output digital codes; calculating a second exposure time period for a second fingerprint sensing operation according to the first output digital codes and the first exposure time periods; and performing the second fingerprint sensing operation in the second exposure time to generate a second output digital code.

In some embodiments, when a fingerprint sensing command is received, the fingerprint sensing device performs a plurality of first fingerprint sensing operations in first exposure time periods to generate a plurality of first output digital codes, in which the first exposure time periods are relatively short and are preset periods in some embodiments. Next, the second exposure time period and/or correction values are calculated based on the first exposure time periods and the first output digital codes. In this way, the appropriate exposure time period (i.e., second exposure time period) and/or correction values for the second fingerprint sensing operation are are quickly and accurately calculated. Accordingly, the fingerprint sensing with high quality and stability is achieved under variations of ambient light intensities.

To make the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
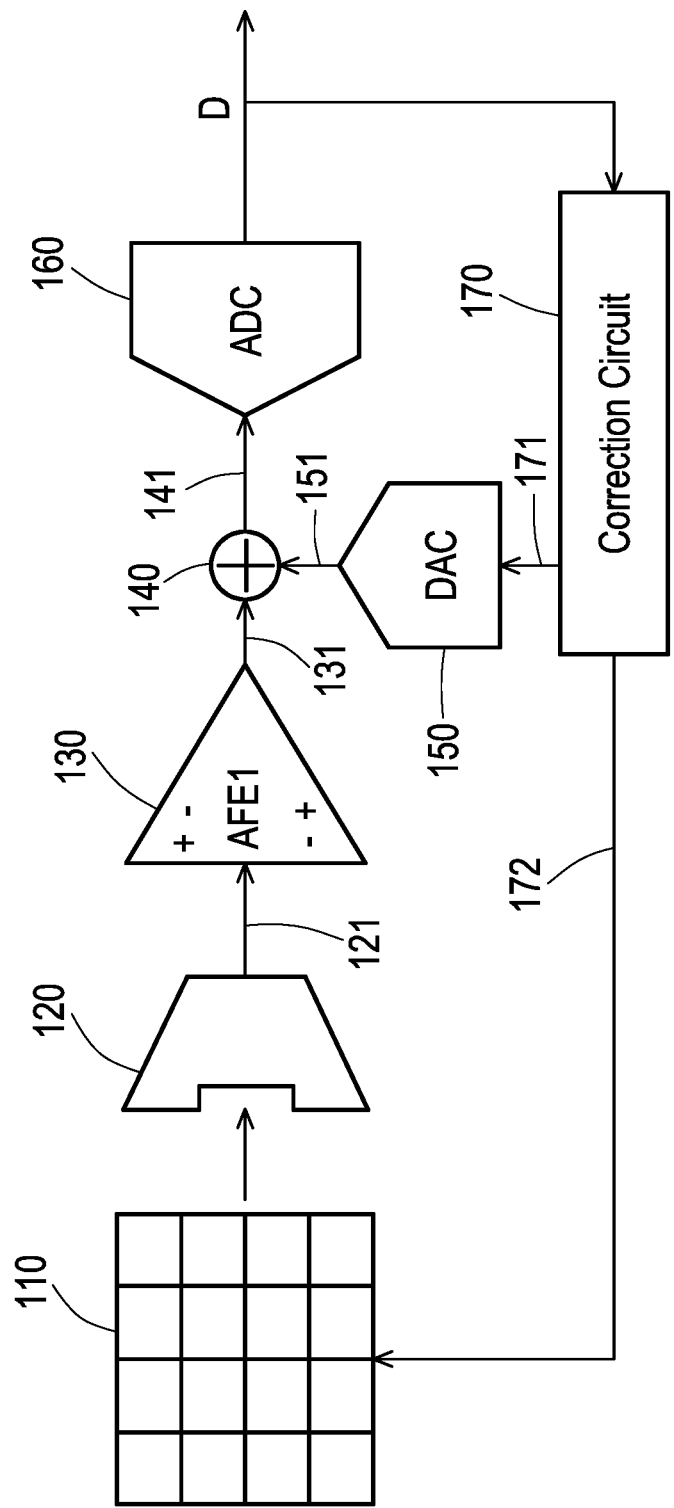
FIG. 1 is a schematic diagram of a fingerprint sensing device in accordance with some embodiments.

FIG. 1 illustrates a fingerprint sensing device 100 that includes a sensor array 110, a readout circuit 120, an analog-front-end (AFE) circuit 130, an adder circuit 140, a digital-to-analog converter (DAC) 150, an analog-to-digital converter (ADC) 160 and a correction circuit 170 in accordance with some embodiments. The sensor array 110 may include a plurality of pixels arranged in rows and columns, and the sensor array 110 is configured to sense the fingerprint of a user. For example, the sensor array 110 may be optical sensor array that captures an image of the user's fingerprint through the pixels of the sensor array 110 to generate a sensing signal. In some embodiments, the sensor array 110 includes sensitive pixels and insensitive pixels (or black pixels), in which the sensitive pixels are configured to output fingerprint sensing signal and the black pixels are configured to output black pixel signal which is non-fingerprint sensing signal. The sensor array 110 may output the fingerprint sensing signal and the black pixel signal in any order sequence. For example, the sensor array 110 may output the black pixel signal first, and then output the fingerprint sensing signal, or vice versa. The black pixel signal outputted from the black pixels should be equal to a preset level (i.e., current value of the black pixel signal is 0 mA) in ideal conditions. However, in real applications (non-ideal conditions), the black pixel signal outputted from the black pixels may be different from the preset level because of noises occurred in the fingerprint sensing device 100. In some embodiments, a black level compensation value is calculated and used to compensate the black pixel signal outputted from the black pixels of the sensor array 110. In some embodiments, the black pixel signal from the black pixels of the sensor array 110 may be used as a reference signal for calibrating fingerprint sensing signal from the sensitive pixels of the sensor array 110. For an example, when current value of the black pixel signal is 1 mA and the current value of the of the fingerprint sensing signal is 10 mA, the current value of the fingerprint sensing signal may be corrected to be 9 mA. In some embodiments, the black pixel signal is corrected with the black level compensation value, and then the fingerprint sensing signal is corrected based on the corrected black pixel signal.

The readout circuit 120 is coupled between the sensor array 110 and the AFE circuit 130 and is configured to read out the pixels of the sensor array 110. For example, the readout circuit 120 may read out a particular row of the pixels of the sensor array 110, or may read out multiple rows of pixels of the sensor array 110. The readout circuit 120 may output the sensing signal 121 from the pixels of the sensor array 110 to the AFE circuit 130. In an embodiment, the sensing signal 121 includes sensing data from both of the black pixels and the sensitive pixels of the sensor array 110. The disclosure does not intend to limit a circuit structure and operations of the readout circuit 120.

The AFE circuit 130 is coupled to the readout circuit 120, and is configured to generate an image signal 131 based on the sensing signal 121 outputted from the readout circuit 120. The AFE circuit 130 may perform processing operations on the sensing signal 121 to generate the image signal 131. For example, the AFE circuit 130 may perform a sampling operation, an amplifying operation and/or a compensation operation on the sensing signal 121 to reduce noises and improve signal quality of the sensing signal 121. The AFE circuit 130 is configured to output the image signal 131 to the adder circuit 140. The disclosure does not intend to limit a circuit structure and operations of the AFE circuit 130.

The adder circuit 140 is coupled to the DAC 150 and the AFE circuit 130, and is configured to receive the image signal 131 from the AFE circuit 130 and an analog compensation signal 151 from the DAC 150. The adder circuit 140 is configured to compensate the image signal 131 with the analog compensation signal 151 to generate a compensated signal 141. In an embodiment, the adder circuit 140 adds the analog compensation signal 151 to the image signal 131 to generate the compensated signal 141. In an embodiment, the analog compensation signal 151 includes a black level compensation signal that is configured to compensate an offset of the black pixel signals outputted by the sensor array 110. The offset of the black pixel signals may occur due to noises from environment and/or noises in the fingerprint sensing device 100. In an embodiment, the analog compensation signal 151 may further include an ADC compensation signal that is configured to compensate the offset of the ADC 160. The description about compensating the offset of the DAC 160 will be described in association with the FIG. 3 and FIG. 5B.

An input terminal of the ADC 160 is coupled to the adder circuit 140 to receive the compensated signal 141 from the adder circuit 140. The ADC 160 is configured to convert the compensated signal 141 which is an analog signal to a digital output code D. The digital output code D is a digital representation of the user's fingerprint being sensed through the sensor array 100.

The correction circuit 170 is coupled to the ADC 160 to receive the output digital code D, and is configured to generate a compensation signal 171 and an exposure correction signal 172 according to the output digital code D. The exposure correction signal 172 may adapt the exposure time period for a fingerprint sensing operation under different ambient light intensities (i.e., normal, strong and weak ambient light intensities). The compensation signal 171 may indicate the black level compensation signal and/or the ADC compensation signal for compensating the black pixel signals and/or the offset of the ADC, respectively. In an embodiment, the correction circuit 170 is configured to receive a plurality of first output digital codes generated by performing a plurality of first fingerprint sensing operations under first exposure time periods. The correction circuit 170 may calculate a second exposure time period and/or the black level compensation signal and/or the ADC compensation signal for a second fingerprint sensing operation based on the first output digital codes and the first exposure time periods. The DAC 150 is coupled to the correction circuit 170 and is configured to convert the compensation signal 171 to generate the analog compensation signal 151. The ADC 150 outputs the analog compensation signal 151 to the adder circuit 140 for compensating the image signal 131.

Figure 2A:
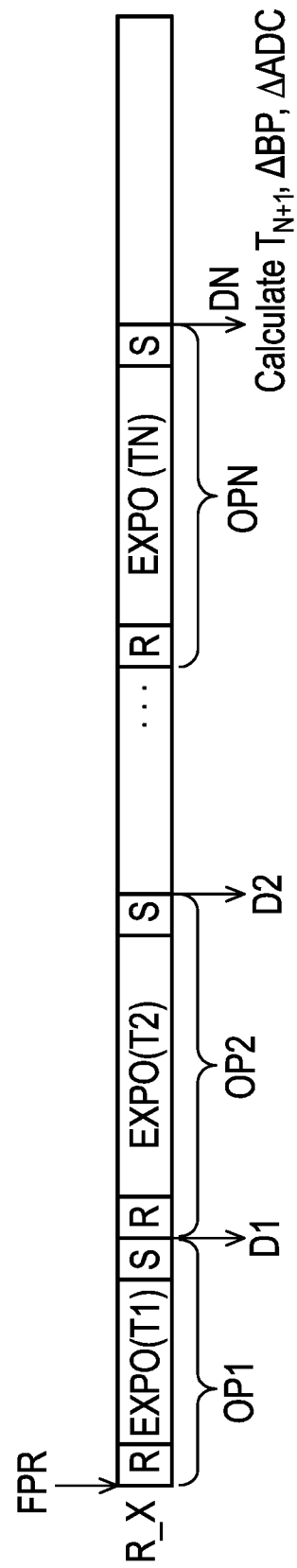
FIG. 2A and FIG. 2B are timing diagrams of fingerprint sensing operations in accordance with some embodiments.
Figure 2B:
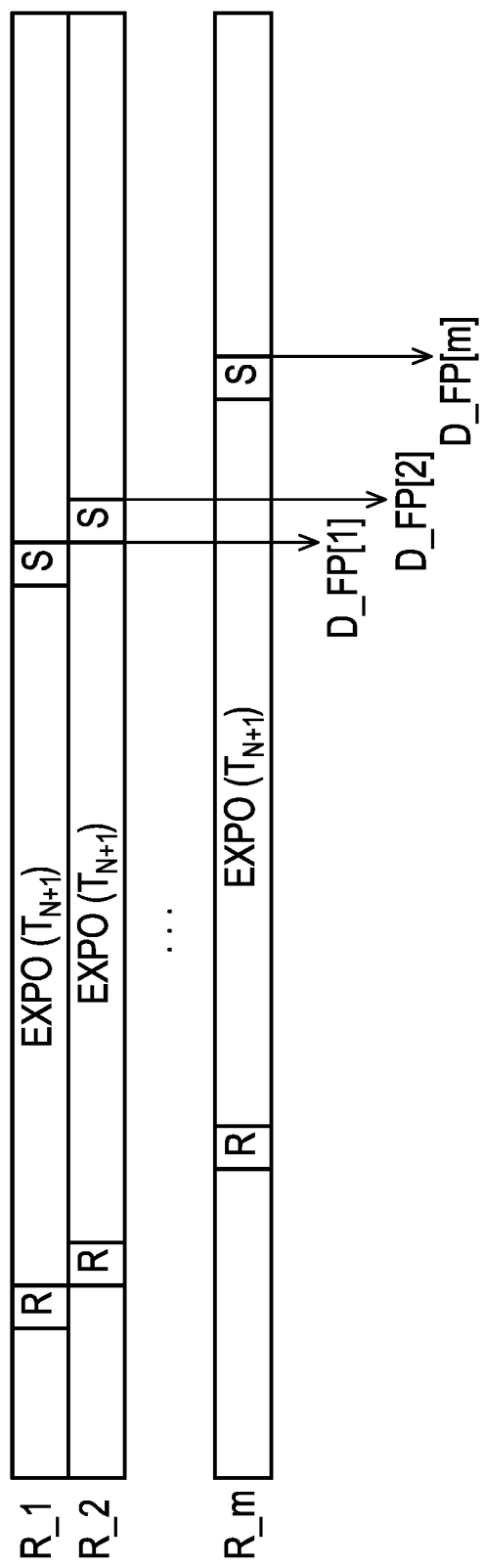

FIG. 2A and FIG. 2B illustrate operation timings of fingerprint sensing operations OP1 through OP_N+1 in accordance with some embodiments. In an embodiment, each of the fingerprint sensing operations OP1 through OP_N+1 includes a reset operation R, an exposure operation EXPO and a sampling operation S. When a fingerprint sensing operation is performed, the reset operation R, the exposure operation EXPO and the sampling operation S of the fingerprint sensing operation is sequentially performed. The reset operation R is configured to reset at least one pixel of the sensor array 110. The exposure operation EXPO is performed following the rest operation to expose the at least one pixel of the sensor array 110 in an exposure time period. The sampling operation S samples the fingerprint image to generate the output digital code D.

Referring to FIG. 1 and FIG. 2A, when the fingerprint sensing command FPR is received by the fingerprint sensing device 100, the fingerprint sensing device 100 performs a plurality of fingerprint sensing operations OP1 through OPN to obtain a plurality of output digital codes D1 through DN, in which N is greater than or equal to 2. For example, in fingerprint sensing operations OP1, the reset operation R, the exposure operation EXPO in the exposure time period T1 and the sampling operation S are sequentially performed to generate the output digital code D1. Similarly, in fingerprint sensing operations OPN, the reset operation R, the exposure operation EXPO in the exposure time period TN and the sampling operation S are sequentially performed to generate the output digital code DN. In an embodiment, the fingerprint sensing operations OP1 through OPN are performed to sense a row R_X of the sensor array 110. The row R_X can be any row in the sensor array 110 and the row R_X can be selected by the user. In an example, the row R_X may be a center row of the sensor array 110, but the disclosure is not limited thereto. In an embodiment, the exposure time periods T1 through TN are preset exposure time periods.

After the fingerprint sensing device 100 performs the fingerprint sensing operation OPN, the correction circuit 170 of the fingerprint sensing device 100 may calculate the exposure time period $T_{N+1}$ for the fingerprint sensing operation OP_N+1 based on the output digital codes D1 through DN and the exposure time periods T1 through TN. The correction circuit 170 may further calculate the black level compensation signal ΔBP and/or ADC compensation signal ΔADC based on the output digital codes D1 through DN and the exposure time periods T1 through TN. The black level compensation signal ΔBP may be used to compensate the black pixel signals obtained by reading out the black pixels of the sensor array 110 in the fingerprint sensing operation OP_N+1. The ADC compensation signal ΔADC may be used to compensate the offset of the ADC 160 in the fingerprint sensing operation OP_N+1.

FIG. 2B illustrates operation timings of the fingerprint sensing operation OP_N+1 in accordance with some embodiments. After the exposure time period $T_{N+1}$, the black level compensation signal ΔBP and/or ADC compensation signal ΔADC are calculated, the fingerprint sensing device 100 is configured to perform the fingerprint sensing operation OP_N+1 to sense the user's fingerprint based on the exposure time period $T_{N+1}$, the black level compensation signal ΔBP and/or ADC compensation signal ΔADC. In an embodiment, the fingerprint sensing device 100 may perform the fingerprint sensing operation OP_N+1 to read out pixel signals from all the rows of the sensor array 110. Referring to FIG. 1 and FIG. 2B, the fingerprint sensing device 100 may perform the fingerprint sensing operation OP_N+1 in the exposure time period $T_{N+1}$ to sense the pixels in the rows R_1 through R_m of the sensor array 111 to obtain the output digital codes D_FP[1] through D_FP[m]. For example, in the fingerprint sensing operation OP_N+1, the pixels of the row R_1 is exposed during the exposure time period $T_{N+1}$, and the fingerprint sensing device 100 is configured to sense the row R_1 to generate the output digital code D_FP[1]. Similarly, in the fingerprint sensing operation OP_N+1, the pixels of the row R_m is exposure during the exposure time period $T_{N+1}$, and the fingerprint sensing device 100 is configured to sense the row R_m to generate the output digital code D_FP[m]. The output digital codes D_FP[1] through D_FP[m] may be combined to generate an output digital code D_FP which represents the fingerprint image sensed by the sensor array 110. Since the exposure time period $T_{N+1}$ is calculated based on the output digital codes D1 through DN and the exposure time periods T1 through TN, the appropriate exposure time for the fingerprint sensing operation OP_N+1 can be accurately and quickly determined. As a result, the quality and stability of the output digital codes D_FP[1] through D_FP[m] are improved; and the performance of the fingerprint sensing device 100 is improved.

In some embodiments, the black level compensation signal ΔBP that is calculated based on the output digital codes D1 through DN and the exposure time periods T1 through TN is used to compensate the black pixel signals in the in the fingerprint sensing operation OP_N+1. In this way, the black pixel signals obtained by reading out the black pixels of the sensor array 110 can be accurately and quickly compensated, resulting in further performance improvement of the fingerprint sensing device 100. In an embodiment, the ADC compensation signal ΔADC is used to compensate the offset of the ADC 160 in the fingerprint sensing operation OP_N+1.

Figure 3:
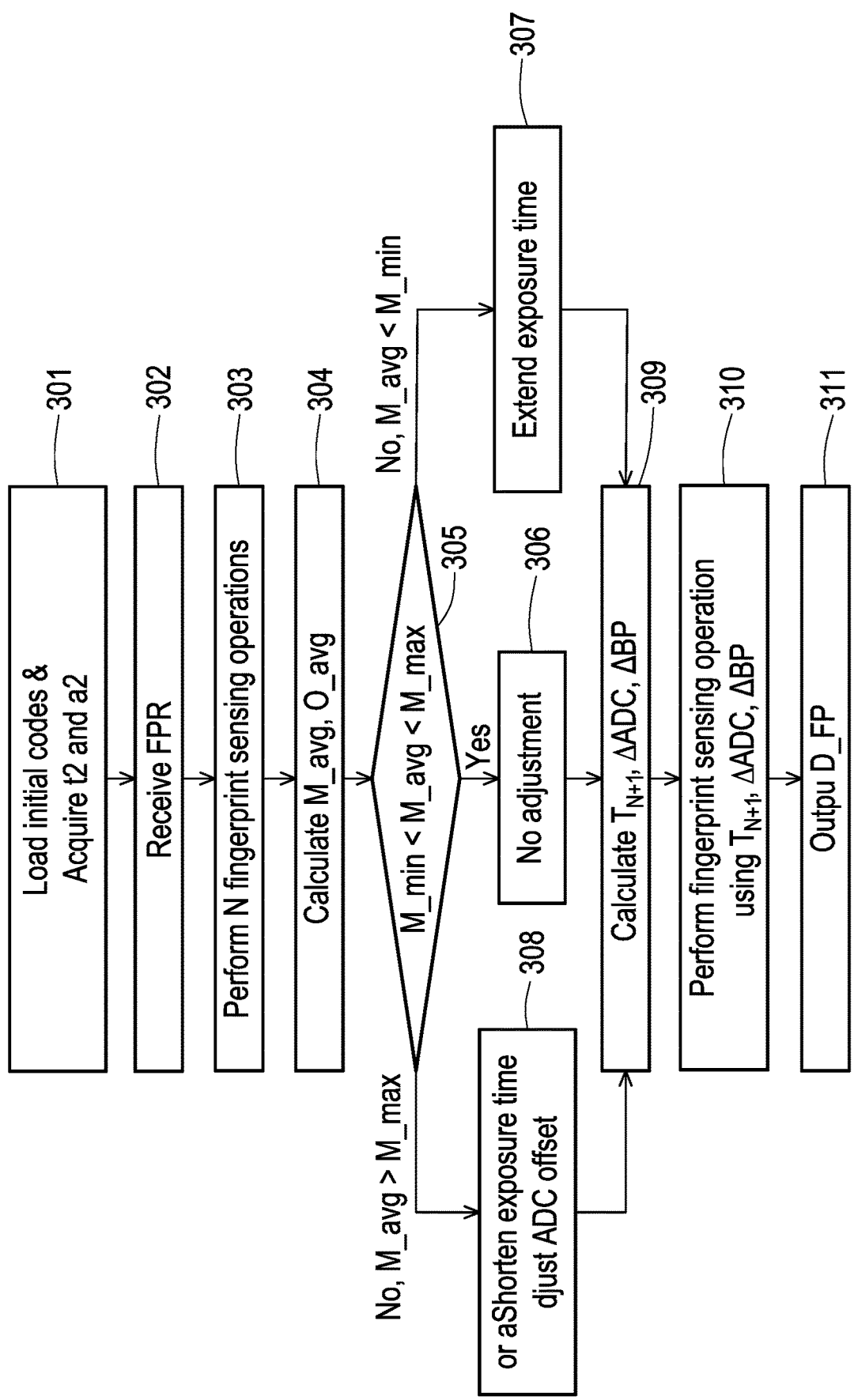
FIG. 3 is a flowchart diagram of a fingerprint sensing method in accordance with some embodiments.

FIG. 3 illustrates a flowchart diagram of a fingerprint sensing method in accordance with some embodiments. In block 301, the method performs an initial process by loading the initial codes and acquiring a reference exposure time period t2 and a reference slope a2. The slope a2 is the slope of a reference D-T line which indicates an ideal relation between the digital output code and the exposure time period under an ideal ambient light intensity. The reference exposure time period t2 may indicates the exposure time for the fingerprint sensing device 100 to output a target output digital code. The reference exposure time t2 and the reference slope a2 may be stored in a non-volatile memory (not shown) and can be acquired in the initial process of the fingerprint sensing device 100. The initial process may be performed when the fingerprint sensing device 100 is powered up, but the disclosure is not limited thereto.

When the fingerprint sensing device 100 receives a fingerprint sensing command FPR in block 302, the fingerprint sensing device 100 performs N fingerprint sensing operations in block 303, in which N is greater than or equal to 2. The N fingerprint sensing operations are performed in the N preset exposure time periods. As the example shown in FIG. 2A, the fingerprint sensing device 100 performs the N fingerprint sensing operations OP1 through OPN in the N exposure time periods T1 through TN to generate the digital output codes D1 though DN. The correction circuit 170 of the fingerprint sensing device 100 may generate a plurality of D-T lines (also referred to as characteristic lines) based on the digital output codes D1 though DN and the exposure time periods T1 through TN. The D-T lines indicate relations between the digital output codes D1 though DN and the exposure time periods T1 through TN. It is noted that each of the D-T lines may be characterized by a slope and a coefficient.

Figure 4:
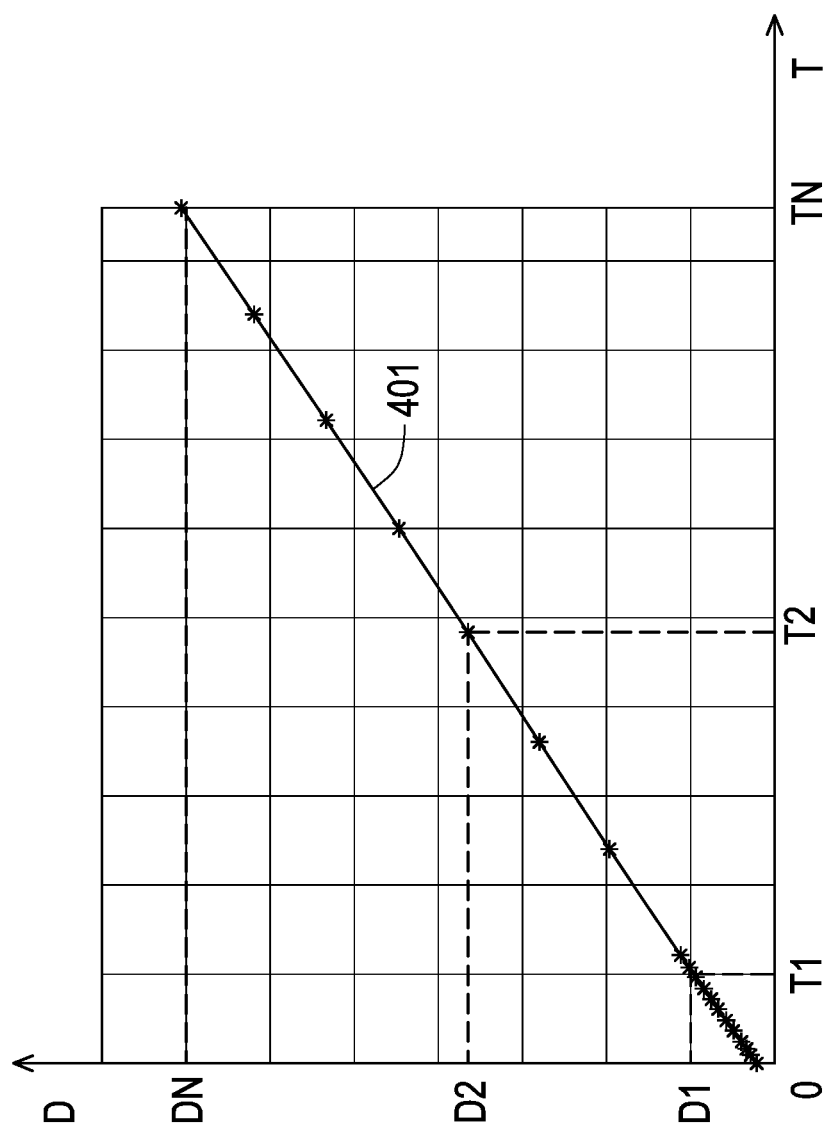
FIG. 4 is a diagram illustrating an exemplary digital output code versus exposure time (D-T) line in accordance with some embodiments.

In block 304, the correction circuit 170 of the fingerprint sensing device 100 may calculate an average slope M_avg by averaging the slopes of the D-T lines that are calculated based on the digital output codes D1 though DN and the exposure time periods T1 through TN. Equation (1) illustrates an exemplary way to calculate the average slope M_avg based on the slopes of the D-T lines. In the equation (1), $M_{1-2}$ indicates the slope of the D-T line that is formed by the digital output codes D1 and D2 and their corresponding exposure time periods T1 and T2. Similarly, the $M_{N-1-N}$ indicates the slope of the D-T line that is formed by the digital output code D_N−1 and DN and their corresponding exposure time periods T_N−1 and TN. In some embodiments, the correction circuit 170 furthers calculate an average offset O_avg of the D-T lines according to the equation (2), in which the $O_{1-2}$ through ON-1-N indicate the offsets of the D-T lines. When the average slope M_avg and the average offset O_avg of the D-T lines are determined, the correction circuit 170 may form an average D-T line based on the average slope M_avg and the average offset O_avg. FIG. 4 illustrates an example of the average line 401 that is formed by the average slope M_avg and the average offset O_avg.

$$M = \frac{M_{1-2} + M_{2-3} + M_{3-4} + M_{4-5} + \ldots + M_{N-1-N}}{N} \quad (1)$$

$$O = \frac{O_{1-2} + O_{2-3} + O_{3-4} + O_{4-5} + \ldots + O_{N-1-N}}{N} \quad (2)$$

In block 305, the correction circuit 170 is configured to compare the average slope M_avg with a predetermined range that is defined by an upper threshold value M_max and a low threshold value M_min. In block 306, when the average slope M_avg is within the predetermined range, the correction circuit 170 may determine that the fingerprint sensing operations OP1 through OPN are performed under appropriate ambient light intensity. Thus, the correction circuit 170 does not adjust the reference exposure time period t2, and set the reference exposure time period t2 as the exposure time period $T_{N+1}$ of the next fingerprint sensing operation OP_N+1.

When the average slope M_avg is outside of the predetermined range, the correction circuit 170 is further configured to determine whether the average slope M_avg is more than the upper threshold value M_max or whether the average slope M_avg is less than the lower threshold value M_min. When the average slope M_avg is less than the lower threshold value M_min, the correction circuit 170 determines that the fingerprint operations OP1 through OPN are performed under weak ambient light intensity. Thus, the correction circuit is configured to extend the reference exposure time period t2 by a correction period Δt2 to generate the exposure time period $T_{N+1}$ (block 307). The correction period Δt2 is determined according to the difference between the reference D-T line and the average D-T line.

When the average slope M_avg is more than the upper threshold value M_max of the predetermined range, the correction circuit 170 determines that the fingerprint operations OP1 through OPN are performed under strong ambient light intensity. Thus, in an embodiment, the fingerprint sensing device 100 is configured to shorten the reference exposure time period t2 by a correction period Δt1 to generate the exposure time period $T_{N+1}$ (block 308). The correction period Δt1 is determined according to the difference between the reference D-T line and the average D-T line. Details about the correction periods Δt1 and Δt2 will be described in association with FIG. 5A.

In an alternative embodiment, instead of shortening the exposure time by the correction period Δt1, the correction circuit 170 may adjust the ADC offset by the offset value ΔADC when average slope M_avg is more than the upper threshold value M_max (block 308). The correction circuit 170 may shift down the average D-T line by the offset value ΔADC, such that the range of the digital output codes of the fingerprint sensing device 100 cover both negative and positive range. In this way, the amplitude of the signals sensed from the sensor array are not reduced because of shorting in the exposure time period. The details of the offset value ΔADC will be described in association with FIG. 5B.

In block 309, the exposure time period $T_{N+1}$, the black level compensation value ΔBP and/or the offset value ΔADC for the fingerprint sensing operation OP_N+1 are calculated. Next, the fingerprint sensing device 100 performs the fingerprint sensing operation OP_N+1 using the exposure time period $T_{N+1}$, the black level compensation value ΔBP and/or the offset value ΔADC (block 310). The fingerprint sensing device 100 outputs the digital output code D_FP that indicates the image of the user's fingerprint in the block 311.

Figure 5A:
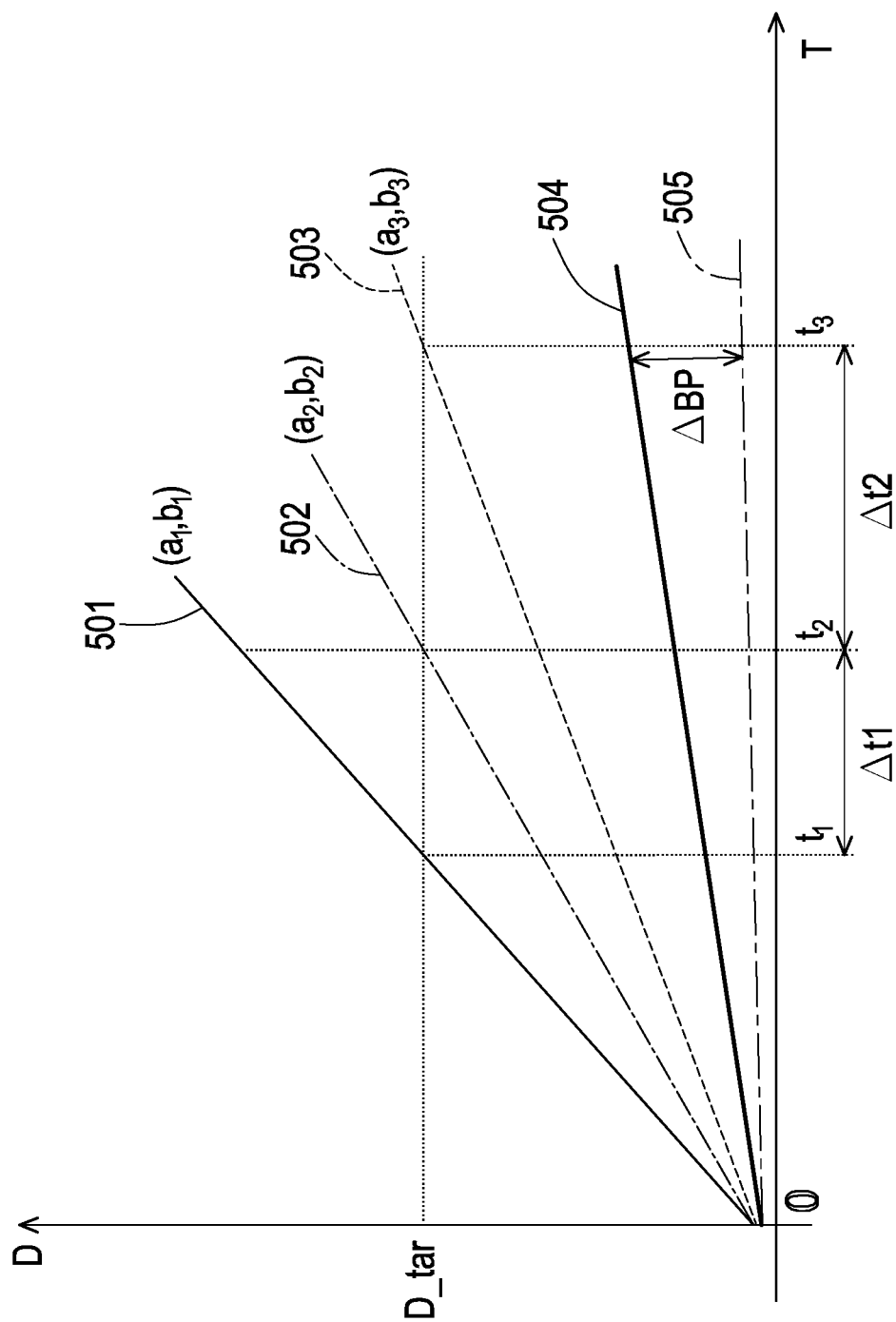
FIG. 5A and FIG. 5B are diagrams illustrating D-T lines of a fingerprint sensing device in accordance with some embodiments.

FIG. 5A is a diagram illustrating D-T lines 501 through 505 (also referred to as characteristic lines) in accordance with some embodiments. The vertical axis of the diagram illustrates the digital output code D, and the horizontal axis of the diagram illustrates the exposure time period T. The D-T line 502 represents an ideal output digital code reading out from sensitive pixels under ideal ambient light intensity. The D-T line 502 indicates that the ideal output digital code is a target digital output code D_tar when the exposure time period is t2. The D-T line 502 is characterized by the reference slope a2 and a reference coefficient b2.

The D-T line 503 represents an exemplary output digital code reading out from sensitive pixels under weak ambient light intensity. The D-T line 503 is characterized by a slope a3 and a coefficient b3, wherein the slope a3 is less than the reference slope a2. The D-T line 503 indicates that under the weak ambient light intensity, the fingerprint sensing device 100 requires the longer exposure time period t3 than the reference exposure time period t2 to output the target digital output code D_tar. A difference between the exposure time period t3 and the reference exposure time period t2 is determined as Δt2. In an embodiment, when the correction circuit 170 of the fingerprint sensing device 100 determines that the fingerprint sensing operations OP1 through OPN are performed under weak ambient light intensity, the correction circuit 170 is configured to extend the reference exposure time period t2 by the correction period which is equal to Δt2 to generate the exposure time period $T_{N+1}$. The fingerprint sensing device 100 performs the next fingerprint sensing operation OP_N+1 using the exposure time period $T_{N+1}$. In this way, the fingerprint sensing device 100 may output high-quality image signal under weak ambient light intensity.

The D-T line 501 represents an exemplary output digital code reading out from sensitive pixels under strong ambient light intensity. The D-T line 501 is characterized by a slope a1 and a coefficient b1, wherein the slope a1 is more than the reference slope a2. The D-T line 501 indicates that under the strong ambient light intensity, the fingerprint sensing device 100 requires the shorter exposure time period t1 than the reference exposure time period t2 to output the target digital output code D_tar. A difference between the exposure time period t1 and the reference exposure time period t2 is determined as Δt1. In some embodiments, when the correction circuit 170 determines that the fingerprint sensing operations OP1 through OPN are performed under strong ambient light intensity, the correction circuit 170 is configured to shorten the reference exposure time period t2 by the correction period which is equal to Δt1 to generate the exposure time period $T_{N+1}$. The fingerprint sensing device 100 may perform the next fingerprint sensing operation OP_N+1 using the exposure time period $T_{N+1}$, to output high-quality image signal under strong ambient light intensity.

The D-T lines 505 (also referred to a reference D-T line 505) represents ideal output digital code (or ideal black levels) reading out from black pixels; and the D-T line 504 represents exemplary output digital code (or black levels) reading out from the black pixels of the sensor array 110. As shown FIG. 5A, for each of exposure time period, a difference between the ideal black level in the reference D-T line 505 and the black level in the D-T line 504 may occur due to noises in the fingerprint sensing device 100. In an embodiment, for each exposure time period, the correction circuit 170 of the fingerprint sensing device 100 may determine the black level compensation value ΔBP based on the difference between ideal black levels and the black levels sensed from the sensor array 110. The fingerprint sensing device 100 may compensate the black levels sensed from the sensor array 110 using the black level compensation value ΔBP to further improve the stability and the quality of the image signals sensed from the sensor array 110.

Figure 5B:
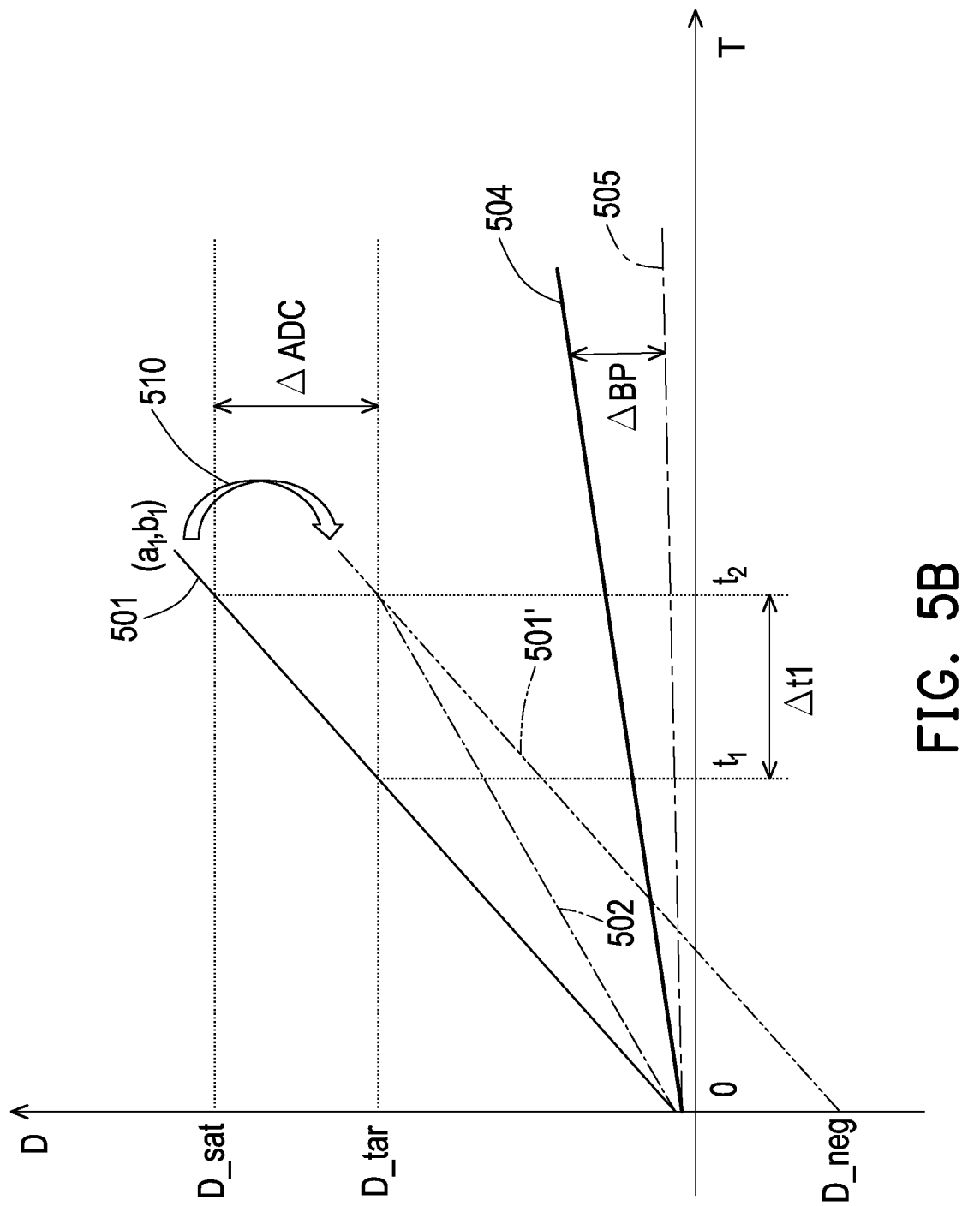

FIG. 5B is a diagram illustrating D-T lines of the fingerprint sensing device 100 under strong ambient light intensity in accordance with some embodiments. The same elements of FIG. 5B and FIG. 5A are shown with the same reference numbers. A difference between FIG. 5A and FIG. 5B is that FIG. 5B further illustrates a shifted D-T line 501' which is generated by shifting down the D-T line 501 an offset value ΔADC to a negative direction of the vertical axis, in which the slope of the D-T line 501 is same as the slope of the D-T line 501'. The shifting operation which shifts D-T line 501 to generate the shifted D-T line 501' is represented by the arrow 510. The offset value ΔADC may be calculated according to the slope a1 of the D-T line 501 and a difference Δt1 between the exposure time period t1 and the exposure time period t2. More particularly, the offset value ΔADC may be calculated according to the following equation (3) and (4).

$$\Delta t1 = t2 - t1 \quad (3)$$

$$\Delta ADC = a1 * \Delta t1 \quad (4)$$

In an embodiment, when the correction circuit 170 determines that the fingerprint sensing operations are performed under the strong ambient light intensity, the correction circuit 170 does not shorten the exposure time period. Instead, the correction circuit 170 may calculate the offset value ΔADC and then shift down the D-T line 501 to generate the shifted D-T line 501'. The fingerprint sensing device 100 may compensate the ADC 160 with the calculated offset value ΔADC to generate high-quality image signal under the strong ambient light intensity. Referring to FIG. 1 and FIG. 5B, the offset value ΔADC that is calculated by the correction circuit 170 may be converted to the analog compensation signal 151 by the DAC150 and then be added to the compensating the image signal 131 to generate the compensated signal 141. In this way, the fingerprint sensing device 100 may compensate the ADC 160 with the calculated offset value ΔADC.

As a result of the shifting down the D-T line 501 by the offset value ΔADC, the digital output code D of the shifted D-T line 501' starts from a negative digital output code D neg. As the digital output code D of the shifted D-T line 501' can cover both of the negative digital output codes and positive digital output codes, the range of the digital output code is maintained under the strong ambient light intensity. Therefore, amplitudes of the fingerprint sensing signals sensed from the sensor array 110 of the fingerprint sensing apparatus 100 is improved.

Figure 6:
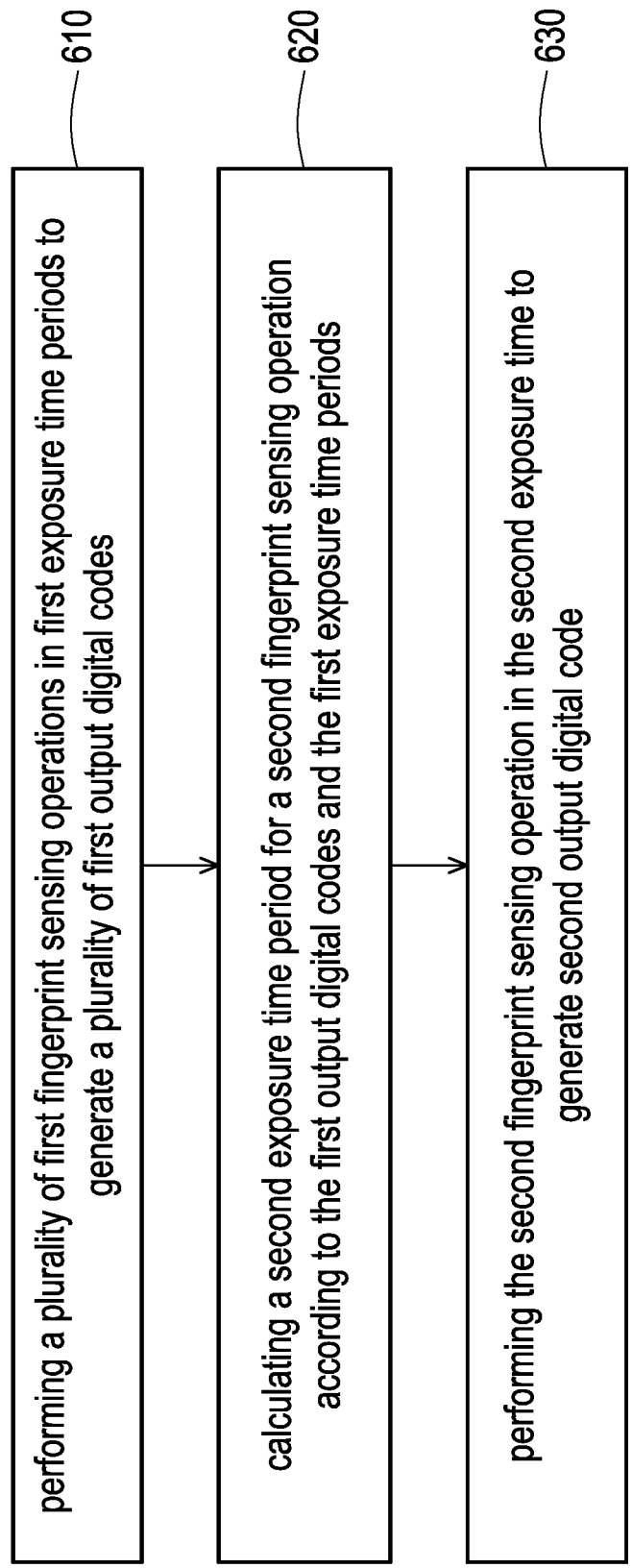
FIG. 6 is a flowchart diagram of a fingerprint sensing method in accordance with some embodiments.

FIG. 6 is a flowchart diagram illustrating a fingerprint sensing method in accordance with some embodiments. In block 610, a plurality of first fingerprint sensing operations are performed in first exposure time periods to generate a plurality of first output digital codes. Referring to FIG. 2A and FIG. 6, the fingerprint sensing device 100 may perform a plurality of fingerprint sensing operations OP1 through OPN in exposure time periods T1 through TN to generate a plurality of output digital codes D1 through DN. In block 620, a second exposure time period for a second fingerprint sensing operation is calculated according to the first output digital codes and the first exposure time periods. In block 630, the second fingerprint sensing operation is performed in the second exposure time to generate the second sensing data. Referring to FIG. 2B and FIG. 6, the fingerprint sensing device 100 may perform the fingerprint sensing operations OP_N+1 in exposure time period INA to generate a second output digital code.

From the above embodiments, a fingerprint sensing device may perform a plurality of first fingerprint sensing operations under first exposure time periods to generate first output digital codes. The fingerprint sensing device may calculate the exposure time period, the black pixel compensation signal and/or ADC compensation signal for a second fingerprint sensing operation based on the first output digital codes and the first exposure time periods to obtain the fingerprint image of the user. In this way, the fingerprint sensing device may produce high-quality fingerprint image of the user's fingerprint under different ambient light intensities.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A fingerprint sensing device, comprising:
   an analog-front-end circuit, configured to generate an image signal;
   an analog-to-digital converter, configured to convert the image signal to an output digital code; and
   a correction circuit, coupled to the analog-to-digital converter, configured to:
   receive a plurality of first output digital codes that are generated by performing a plurality of first fingerprint sensing operations in a plurality of first exposure time periods;
   calculate a second exposure time period for a second fingerprint sensing operation according to the first output digital codes and the first exposure time periods,
   wherein the fingerprint sensing device performs the second fingerprint operation in the second exposure time period to generate a second output digital code;
   calculate a black level compensation value for the second fingerprint sensing operation according to the first output digital codes and the first exposure time periods;
   generate a second characteristic line according to the first output digital codes and the first exposure time periods;
   determine a difference between the second characteristic line and a second reference characteristic line; and
   calculate the black level compensation value according to the difference between the second characteristic line and the second reference characteristic line,
   wherein the fingerprint sensing device compensates a back pixel signal in the second fingerprint sensing operation using the black level compensation value.

2. The fingerprint sensing device of claim 1, wherein each of the first exposure time periods is a predetermined exposure time period.

3. The fingerprint sensing device of claim 1, wherein each of the first fingerprint sensing operations is performed to sense pixels in a predetermined row among a plurality of rows of a sensor array, and the second fingerprint sensing operation is performed to sense the pixels in the plurality of rows of the sensor array.

4. The fingerprint sensing device of claim 3, wherein the correction circuit is configured to:
generate a first characteristic line according to the first output digital codes and the first exposure time periods, wherein the first characteristic line indicates a relation between first output digital codes and the first exposure time periods; and
calculate the second exposure time period according to the first characteristic line.

5. The fingerprint sensing device of claim 4, wherein
the first characteristic line is characterized by a slope and a coefficient, and
the correction circuit is configured to calculate the slope and the coefficient of the first characteristic line by averaging slopes and coefficients of lines that are formed according to the first output digital codes and the first exposure time periods.

6. The fingerprint sensing device of claim 5, wherein the correction circuit is configured to:
determine whether the slope of the first characteristic line is within a predetermined range,
set a reference exposure time period as the second exposure time period in response to determining that the slope of the first characteristic line is within the predetermined range.

7. The fingerprint sensing device of claim 6, wherein
the predetermined range comprises an upper threshold value and a lower threshold value, and
the correction circuit is configured to:
determine whether the slope of the first characteristic line is less than the lower threshold value and whether the slope of the first characteristic line is more than the upper threshold value, in response to determining that the slope of the first characteristic line is out of the predetermined range, and
increase the reference exposure time period by a first correction period to generate the second exposure time period in response to determining that the slope of the first characteristic line is less than the lower threshold value,
wherein the first correction period is determined according to the first characteristic line and a first reference characteristic line.

8. The fingerprint sensing device of claim 6, wherein the correction circuit is further configured to:
decrease the reference exposure time period by a second correction period to generate the second exposure time period in response to determining that the slope of the first characteristic line is more than the upper threshold value,
wherein the second correction period is determined according to the first characteristic line and a first reference characteristic line.

9. The fingerprint sensing device of claim 6, wherein in response to determining that the slope of the first characteristic line is more than the upper threshold value of the predetermined range, the correction circuit is further configured to:
calculate a compensation value according to first characteristic line and a first reference characteristic line; and
compensate the analog-to-digital converter with the compensation value.

10. The fingerprint sensing device of claim 9, further comprising:

a digital-to-analog converter, coupled to the correction circuit, configured to receive the compensation value from the correction circuit, and covert the compensation value to an analog compensation signal; and
an adder circuit, coupled to the digital-to-analog converter and the analog-front-end circuit, configured to add the analog compensation signal to the image signal to generate a compensated signal, and output the compensated signal to the analog-to-digital converter,
wherein the analog-to-digital converter converts the compensated signal to generate the second output digital code of the second fingerprint sensing operation.

11. A fingerprint sensing method, comprising:
performing a plurality of first fingerprint sensing operations in first exposure time periods to generate a plurality of first output digital codes;
calculating a second exposure time period for a second fingerprint sensing operation according to the first output digital codes and the first exposure time periods;
performing the second fingerprint sensing operation in the second exposure time to generate a second output digital code;
calculating a black level compensation value for the second fingerprint sensing operation according to the first output digital codes and the first exposure time periods;
generating a second characteristic line according to the first output digital codes and the first exposure time periods;
determining a difference between the second characteristic line and a second reference characteristic line; and
calculating the black level compensation value according to the difference between the second characteristic line and the second reference characteristic line,
wherein a back pixel signal in the second fingerprint sensing operation is compensated using the black level compensation value.

12. The fingerprint sensing method of claim 11, wherein
each of the first exposure time periods is a predetermined exposure time period,
each of the first fingerprint sensing operations is performed to sense pixels in a predetermined row among a plurality of rows of a sensor array, and
the second fingerprint sensing operation is performed to sense pixels in the plurality of rows of the sensor array.

13. The fingerprint sensing method of claim 12, wherein calculating the second exposure time period for the second fingerprint sensing operation according to the first output digital codes and the first exposure time periods comprises:
generating a first characteristic line according to the first output digital codes and the first exposure time periods, wherein the first characteristic line indicates a relation between first output digital codes and the first exposure time periods; and
calculating the second exposure time period according to the first characteristic line.

14. The fingerprint sensing method of claim 13, further comprising:
calculating a slope of the first characteristic line;
determining whether the slope of the first characteristic line is within a predetermined range; and
setting a reference exposure time period as the second exposure time period in response to determining that the slope of the first characteristic line is within the predetermined range.

15. The fingerprint sensing method of claim 14, further comprising:

determining whether the slope of the first characteristic line is less than the lower threshold value and whether the slope of the first characteristic line is more than the upper threshold value, in response to determining that the slope of the first characteristic line is out of the predetermined range; and increasing the reference exposure time period by a first correction period to generate the second exposure time period in response to determining that the slope of the first characteristic line is less than the lower threshold value, wherein the first correction period is determined according to the first characteristic line and a first reference characteristic line.

16. The fingerprint sensing method of claim 14, further comprising:

decreasing the reference exposure time period by a second correction period to generate the second exposure time period in response to determining that the slope of the first characteristic line is more than the upper threshold value, wherein the second correction period is determined according to the first characteristic line and a first reference characteristic line.

17. The fingerprint sensing method of claim 13, further comprising:

calculating a compensation value according to first characteristic line and a first reference characteristic line and compensating the analog-to-digital converter with the compensation value in response to determining that the slope of the first characteristic line is more than the upper threshold value of the predetermined range.

18. The fingerprint sensing method of claim 17, further comprising:

converting the compensation value to an analog compensation signal;

adding the analog compensation signal to the fingerprint analog signal in the second fingerprint sensing operation to generate a compensated signal; and converting the compensated signal to generate the second output digital code of the second fingerprint sensing operation.

\* \* \* \* \*